(12) United States Patent
Corbel et al.

(10) Patent No.: US 12,486,009 B2
(45) Date of Patent: Dec. 2, 2025

(54) INTERFACE DEVICE FOR AN INFLATABLE INDIVIDUAL SAFETY DEVICE

(71) Applicant: Autoliv Development AB, Vargarda (SE)

(72) Inventors: Sebastien Corbel, Landrevarzec (FR); Michael Levasseur, Pont-de-Buis-lès-Quimerch (FR); Maxime Lejeune, Pont-de-Buis-lès-Quimerch (FR); Samuel Vigouroux, Pont-de-Buis-lès-Quimerch (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 728 days.

(21) Appl. No.: 17/756,018

(22) PCT Filed: Nov. 11, 2020

(86) PCT No.: PCT/EP2020/081696
§ 371 (c)(1),
(2) Date: May 13, 2022

(87) PCT Pub. No.: WO2021/094342
PCT Pub. Date: May 20, 2021

(65) Prior Publication Data
US 2022/0402585 A1 Dec. 22, 2022

(30) Foreign Application Priority Data
Nov. 15, 2019 (FR) .................................. FR1912781

(51) Int. Cl.
*B63C 9/18* (2006.01)
*A41D 13/018* (2006.01)
*B63C 9/125* (2006.01)

(52) U.S. Cl.
CPC .............. *B63C 9/18* (2013.01); *A41D 13/018* (2013.01); *B63C 9/1255* (2013.01)

(58) Field of Classification Search
CPC ....... B63C 9/18; B63C 9/1255; A41D 13/018; B60R 21/26; F17C 2205/0373; F17C 2270/0772; A42B 3/0486
See application file for complete search history.

(56) References Cited

U.S. PATENT DOCUMENTS

| 4,161,797 A | 7/1979 | Ruscigno |
| 2003/0049981 A1* | 3/2003 | Mackal ..................... B63C 9/18 |
| | | 441/92 |

(Continued)

FOREIGN PATENT DOCUMENTS

| FR | 2216516 A1 | 8/1974 |
| GB | 1439710 A | 6/1976 |

*Primary Examiner* — Andrew Polay
(74) *Attorney, Agent, or Firm* — DICKINSON WRIGHT PLLC

(57) ABSTRACT

An interface device for an inflatable individual safety device designed to hold a gas generator in a receiving part of the inflatable individual safety device having at least one positioning element designed to position and hold the gas generator in a final mounting position in the receiving part, and a sealing element arranged between the receiving part and the gas generator positioned and held by the at least one positioning element, in order to obtain a seal in an internal space of the safety device to be inflated by the gas generator.

13 Claims, 2 Drawing Sheets

(56) References Cited

U.S. PATENT DOCUMENTS

2010/0206390 A1     8/2010   Hollars et al.
2022/0361599 A1*   11/2022   Mazzarolo ........... A41D 13/018

* cited by examiner

[Fig. 1]
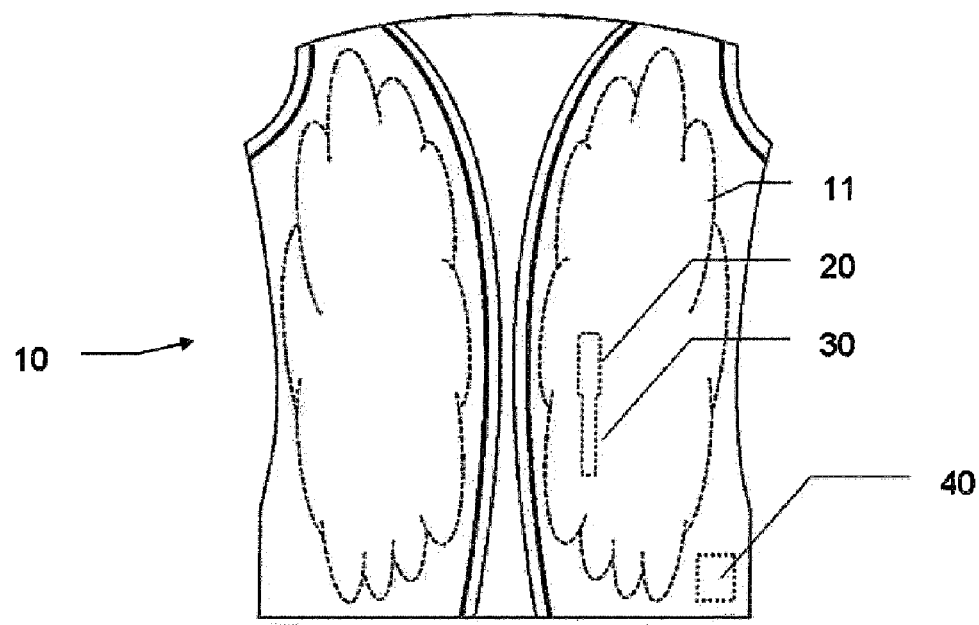
[Fig. 2]
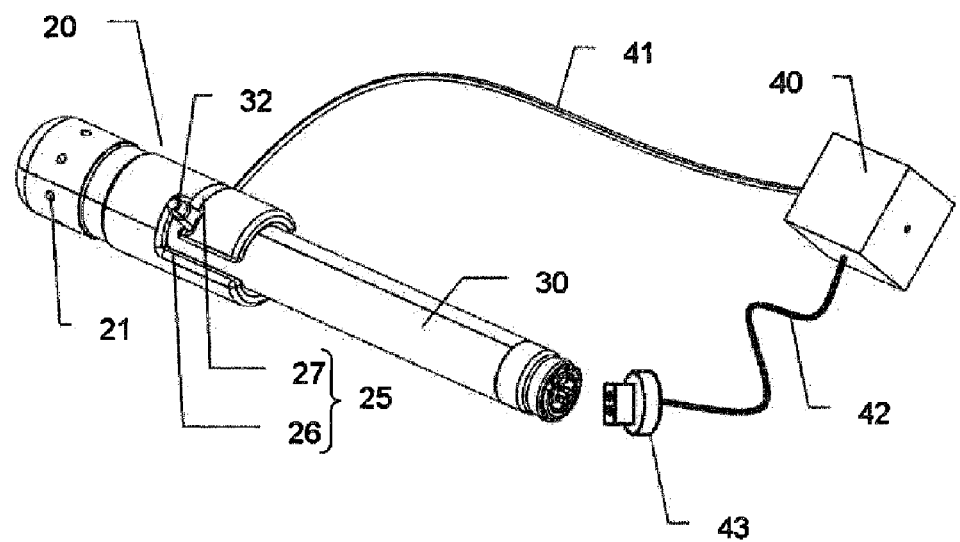

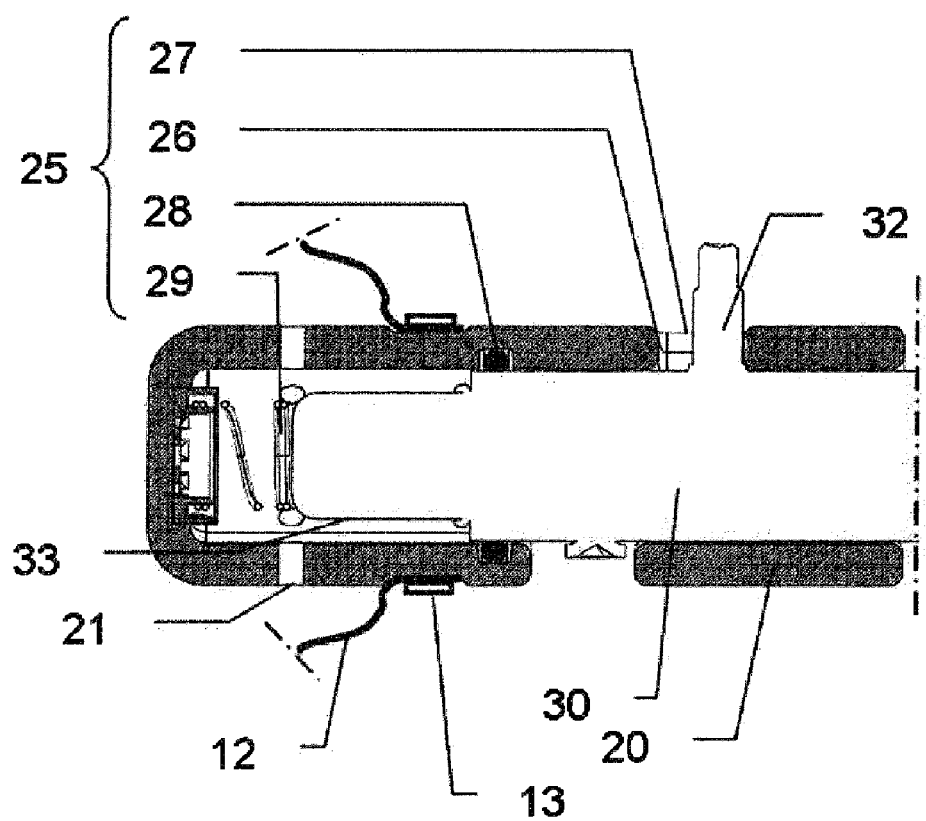
[Fig. 3]

INTERFACE DEVICE FOR AN INFLATABLE INDIVIDUAL SAFETY DEVICE

TECHNICAL FIELD OF THE INVENTION

The present invention generally relates to the field of individual safety devices that comprise an inner space that may be inflated to protect a user in the event of a dangerous situation. Among such devices are vests provided with airbags for motorcyclists, inflatable life vests for sailors, helmets equipped with an inflatable part for cyclists, inflatable ski jackets or equipment for activation in case of avalanche, etc. To summarize, the invention relates to all inflatable individual protective equipment to be worn or used for protection against a shock, a fall or a dangerous situation.

STATE OF THE ART

Known in the prior art is to propose the inflatable individual safety devices mentioned above with a replaceable gas generator, for example a compressed gas cartridge. However, these systems have two significant shortcomings. On the one hand, an incomplete or incorrect mounting may cause a detachment of the replaceable gas generator and lead initially to a total loss of the inflation function and even to (additional) injury of the user if the propulsion gas escapes and propels the replaceable gas generator. On the other hand, an incomplete or incorrect mounting may also create a leakage of inflation gas to the exterior, which diminishes or eliminates any normally expected protective effect.

DISCLOSURE OF THE INVENTION

An objective of the present invention is to overcome the aforementioned shortcomings of the prior art and in particular, firstly, to propose an interface device for an inflatable individual safety device for the purpose of easily mounting a gas generator to ensure complete and safe inflation.

To that end, a first aspect of the invention relates to an interface device of an inflatable individual safety device, designed to hold a gas generator in a receiving part of the inflatable individual safety device, characterized in that it comprises:
  at least one positioning element designed to position and hold the gas generator in a final mounting position in the receiving part,
  a sealing element arranged between the receiving part and the gas generator positioned and held by said at least one positioning element, in order to obtain a seal in an internal space of the safety device to be inflated by the gas generator.

A sealing element is provided between the gas generator and the receiving part according to the implementation above so that a seal may be guaranteed, and the positioning element naturally assists the user in mounting the gas generator in final position. Consequently, the gas generator is correctly held in place and leaks are stopped.

According to one embodiment, the sealing element may be designed to be deformed by a nominal amount by the gas generator in final mounting position. Consequently, even if the generator is mounted incompletely, the sealing element will still be able to be deformed (except for the nominal value thereof) and will be able to ensure its sealing function at least partially.

According to one embodiment, the final mounting position is unique. In other words, any position that may be taken by the gas generator outside the unique final mounting position is not a typically desired or sought final operating position because it may cause degraded or dangerous operation of the inflatable individual device. Indeed, if the gas generator is not correctly positioned it could be rejected during ignition, or gases could possibly not be directed correctly into the safety device.

According to one embodiment, the interface device comprises a locking device (in a unique operating position), designed to lock the gas generator in final mounting position, preferably only when said generator is in, or arrives in, final mounting position. In particular, the interface device is designed to receive the gas generator in final mounting position without holding it in place, and it is only the locking device that ensures the holding in place in final mounting position or the anti-release function of the final mounting position.

In addition, a unique final mounting position may be provided in which the gas generator is locked by the locking device only if the gas generator is located therein. Consequently, as long as it is not in the final mounting position the gas generator is not locked (by the locking device) and therefore not engaged and attached (or mounted) to the interface device.

According to one embodiment, the interface device may comprise a detection element designed to detect (directly or indirectly) the gas generator in final mounting position. Such a detection element incorporated in the interface device makes it possible to guarantee that the user or the safety device will have the information that the gas generator is correctly mounted. In particular, if the gas generator must pass along a mounting track between a free position and the final mounting position, then detection of the gas generator in final mounting position is understood by the fact that the detection element effectively detects the gas generator only when the gas generator has completed at least 90% of the mounting track, preferentially
  at least 95% of the mounting track, and more preferentially 100% of the mounting track. In other words, the detection element is only activated when the gas generator reaches end of mounting track.

A direct detection may be provided, that is the detection element itself carries out the detection of the gas generator, but an indirect detection may also be provided, that is there may be an intermediate part between the gas generator and the detection element.

According to one embodiment, the detection element may comprise a presence sensor, designed to be actuated by a reference member of the gas generator. The detection is done directly via a member of the gas generator, which avoids providing an intermediate mechanism.

According to one embodiment, the reference member may be a part projecting from the gas generator, such as a pin. Such a projecting part (a pin) may also serve to hold or retain the gas generator on the receiving part, which limits the number of components.

According to one embodiment, the presence sensor may be designed to be connected to an electronic control unit of the inflatable individual safety device.

According to one embodiment, said at least one positioning element may comprise an elastic return element designed to position and hold the gas generator in the final mounting position. Typically, a spring may be provided.

Advantageously, the elastic return element may be designed to tend to push the gas generator back outside the receiving part as long as said generator is not in the final unique mounting position. Thus, the user may easily understand that the gas generator is not in place and that the security device cannot function correctly.

In other words, and in general during mounting, the gas generator, as long as it is not in the final mounting position, is in a position called "unstable" or "evidently unmounted." This means that the gas generator in intermediate mounting position cannot remain engaged or attached to the rest of the device in a stable or apparently stable manner, and the user may immediately understand that the gas generator is not in final mounting position. Typically, as long as the gas generator is not in final mounting position, the user cannot let go of the gas generator without it falling or detaching itself from the rest of the device. The locking device or the elastic return element may contribute to enhancing this effect by pushing the gas generator back outside the rest of the device as long as the gas generator is not in the sole and unique final mounting position.

According to one embodiment, said at least one positioning element may comprise a guide track with a rest portion, the guide track being able to be designed to guide the gas generator towards the final mounting position, defined by the rest portion. The guide track typically forms a cam track, and the reference member then forms the cam follower. To carry out the mounting, the user makes the reference member follow the cam track, which is particularly easy. In conjunction with the implementation with the elastic return element, said element participates actively in aiding in the mounting by pushing the gas generator towards the final mounting position. It may be provided that the elastic return element pushes the gas generator in demounted position as long as it has not arrived fully in the final mounting position.

According to one embodiment, a ¼ turn type mounting may be provided, otherwise called bayonet mounting.

According to one embodiment, a screw type mounting may be provided.

In any event, a mounting may be provided involving a rotation of the gas generator by less than one turn (less than 360°).

According to one embodiment, the rest portion may be designed to receive the reference member.

According to one embodiment, the sealing element may comprise a seal, preferably an O ring.

According to one embodiment, the receiving piece may be a sleeve if the gas generator is tubular in shape.

According to one embodiment, the receiving piece may be a plate or a platen if the gas generator comprises an end plate or a flange with attachment holes.

A second aspect of the invention relates to an inflatable individual safety device comprising:
  an interface device according to the first aspect of the invention,
  a receiving part,
  a gas generator,
  an internal space to be inflated by the gas generator.

According to one embodiment, the inflatable individual safety device comprising an electronic control unit, the interface device comprising the detection element connected to the electronic control unit, and the electronic control unit may be connected to the gas generator and may be designed to ignite the gas generator after reception of an ignition command only if the gas generator is detected in final mounting position.

According to one embodiment, the electronic control unit may be designed to warn a user if an absence of the gas generator in final mounting position is detected. In other words, a user is warned if the gas generator is not detected in final mounting position.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which:

FIG. 1 shows a general view of an inflatable individual safety device equipped with a gas generator and an interface device according to the invention, FIG. 2 shows a view in perspective of a portion of the inflatable individual safety device of FIG. 1;

FIG. 3 shows a cross section of a portion of the inflatable individual safety device of FIG. 2.

DETAILED DESCRIPTION OF THE EMBODIMENT(S)

FIG. 1 shows a general view of an inflatable individual safety device equipped with a gas generator 30 and an interface device installed on a receiving part 20 that receives the gas generator 30. In this example, the inflatable individual safety device 10 is in the form of a vest and comprises an internal space 11 to be inflated by the gas generator 30 in a dangerous situation.

Also provided is an electronic control unit 40 the main function of which is to trigger or ignite the gas generator 30. For example, it may be provided to trigger or ignite the gas generator 30 in the event a strong deceleration is detected (a fall of a motorcyclist, for example), if moisture is detected (man overboard, for example), etc. Consequently, the electronic control unit 40 comprises one or more sensors for detecting the above-mentioned dangerous situations.

As shown in FIG. 2, the gas generator 30 is mounted in a receiving part 20, here in the form of a sleeve. In the detail, the receiving part 20 comprises an interface device 25. Said interface device comprises in particular a guide track that forms a positioning element 26 of the gas generator 30 for positioning it and holding it in a final mounting position (as shown in FIG. 2), and a detection sensor that forms a detection element 27 of the gas generator in the final mounting position. In the example shown, the gas generator 30 comprises a pin 32 and it is this projecting part that will be detected by the detection element 27 (an inductive or capacitive sensor, or even an electrical contactor).

The gas generator 30 comprises an electric igniter designed on the free end of the gas generator 30, and said gas generator may be connected to the electronic control unit 40 via a cable 42 and a connector 43. It may be noted that the electronic control unit 40 is also connected to the detection element 27, so that the triggering or igniting of the gas generator 30 may be conditioned on the fact that the gas generator 30 is present and in final mounting position. In addition or alternatively, it may be provided to send a message to the user in the event of use of the inflatable individual safety device 10 when the gas generator 30 is not present and/or not properly in the final mounting position. Consequently, the use of the inflatable individual safety device 10 is secured with a correctly mounted gas generator 30.

FIG. 2 also shows the guide track forming the positioning element 26, and the pin 32 received in a recess of the guide track. Such a mounting, of the ¼ turn type, is easy to achieve even by an inexperienced user, so the risks of incomplete mounting are greatly reduced.

Moreover, and as shown in FIG. 3 which is a cross section of the receiving part 20, a spring 29 is provided that completes the interface device 25, for pushing the gas generator 30 and the pin 32 thereof into the recess of the guide track. Consequently, the final mounting position is a stable position, and if the gas generator 30 is not completely engaged, then the spring 29 may either finish pushing it into the final mounting position, or pushing it back out of the receiving part 20, so that the user himself will see that the mounting is incomplete.

Finally, FIG. 3 shows that the receiving part 20 comprises diffusion orifices 21 that open into the internal space 11 delimited by a flexible wall 12 attached to the receiving part 20 by a collar 13. Thus, gases generated by the gas generator 30, and diffused through a diffuser 33 are directed towards the internal space 11, through the diffusion holes 21.

In order to guarantee complete inflation, it is intended to incorporate into the interface device 25 a sealing element 28, which is an O ring in the present case. However, other types of seal are possible (lip seal, deformable ring, etc.).

It will be understood that various modifications and/or improvements which are obvious for the person skilled in the art may be made to the different embodiments of the invention described in this present description without departing from the scope of the invention defined by the appended claims.

In particular, reference is made to an individual vest, but any type of wearable or portable security device, that is a helmet, a harness, a belt, etc., may be considered.

Moreover, a ¼ turn type mounting interface was described, but snap-on, screw-on or a combination of these connections may be considered. In effect, it involves proposing a simple mounting, and/or with no specific tool, and/or reversible.

Finally, the interface device is installed here in the receiving part, but a different part may be considered, or several parts that cooperate together.

The invention claimed is:

1. An interface device of an inflatable individual safety device, designed to hold a gas generator in a receiving part of the inflatable individual safety device, comprising:
   at least one positioning element designed to position and hold the gas generator in a final mounting position in the receiving part, and
   a sealing element arranged on a radial surface of the gas generator such that the sealing element is disposed between the receiving part and the gas generator positioned and held by said at least one positioning element, in order to obtain a seal in an internal space of the safety device to be inflated by the gas generator,
   a reference member projecting from the gas generator, the reference member configured to hold or retain the gas generator on the at least one positioning element of the receiving part.

2. The interface device according to claim 1, comprising a detection element, designed to detect the gas generator in the final mounting position.

3. The interface device according to claim 1, wherein the detection element comprises a presence sensor, designed to be actuated by the reference member of the gas generator.

4. The interface device according to claim 3, wherein the reference member comprises a pin.

5. The interface device according to claim 3, wherein the presence sensor is designed to be connected to an electronic control unit of the inflatable individual safety device.

6. The interface device according to claim 1, wherein said at least one positioning element comprises an elastic return element designed to position and hold the gas generator in the final mounting position.

7. The interface device according to claim 1, wherein said at least one positioning element comprises a guide track with a rest portion, the guide track being designed to guide the gas generator towards the final mounting position, defined by the rest portion.

8. The interface device according to claim 7, wherein the detection element comprises a presence sensor, designed to be actuated by the reference member of the gas generator and wherein the rest portion is designed to receive the reference member.

9. The interface device according to claim 1, wherein the sealing element comprises an O ring.

10. An inflatable individual safety device, comprising:
    the interface device according to claim 1,
    a receiving part,
    a gas generator, and
    an internal space to be inflated by the gas generator.

11. The inflatable individual safety device according to claim 10, wherein the presence sensor is designed to be connected to an electronic control unit of the inflatable individual safety device and comprising the electronic control unit, and wherein the electronic control unit is connected to the gas generator and is designed to ignite the gas generator after reception of an ignition command, if the gas generator is detected in the final mounting position.

12. The inflatable individual safety device according to claim 11, wherein the electronic control unit is designed to warn a user if the gas generator is not detected in the final mounting position.

13. The interface device according to claim 1, wherein the gas generator is securely mounted by a rotation of the gas generator with less than one full turn.

* * * * *